United States Patent Office 3,026,330
Patented Mar. 20, 1962

3,026,330
CHROMAN COMPOUNDS HAVING
ANTIOXIDANT ACTIVITY
Karl Folkers, Plainfield, and Donald E. Wolf, Princeton, N.J., assignors to Merck & Co., Inc., Rahway, N.J., a corporation of New Jersey
No Drawing. Filed May 9, 1960, Ser. No. 27,518
4 Claims. (Cl. 260—345.5)

This invention relates to new chroman compounds which are useful antioxidants and methods of preparing the same. More particularly it is concerned with 2,2,5-trimethyl - 6 - hydroxy-7,8-dimethoxy chroman; 2,5-dimethyl - 2 (4' methyl - 3' - pentenyl)-6-hydroxy-7,8-dimethoxy chroman; 2,5 - dimethyl-2-(4',8',12'-trimethyl tridecyl)6-hydroxy-7,8-dimethoxy chroman; acyl derivatives thereof, and methods of preparing these compounds.

It is an object of the present invention to provide new chroman compounds having antioxidant activity. Another object is to provide processes for the preparation of these compounds and their acylated derivative. Other objects will be apparent from the detailed description of the invention hereinafter provided.

The new chroman compounds are represented by the formula (I)
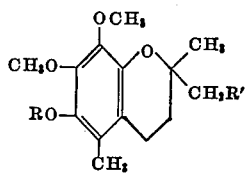

in which R represents a hydrogen or an acyl radical and R' represents hydrogen, a 3-methyl-2-butenyl radical or a 3,7,11-trimethyldodecyl radical.

The starting material for the preparation of the new chromans of the present invention are hydroquinones of the formulas

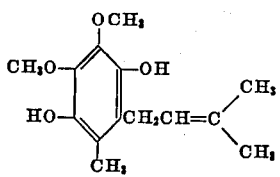

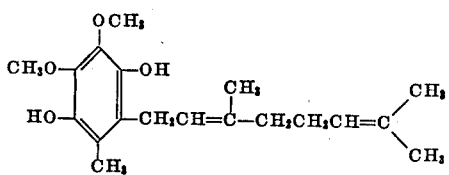

and

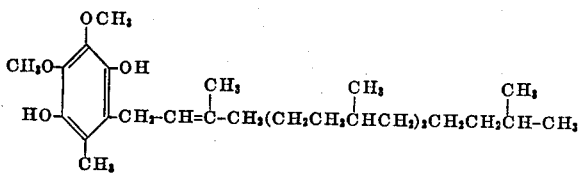

and the corresponding benzoquinones which may be prepared from the known compound 2,3-dimethoxy-5-methylbenzoquinone according to the methods described in copending U.S. patent application Ser. No. 758,648 of Karl Folkers and Clifford Shunk and U.S. patent application Ser. No. 757,464 of Karl Folkers and Clifford Shunk. The process by which the above starting materials are converted to the new chromans of our invention can be illustrated structurally as follows

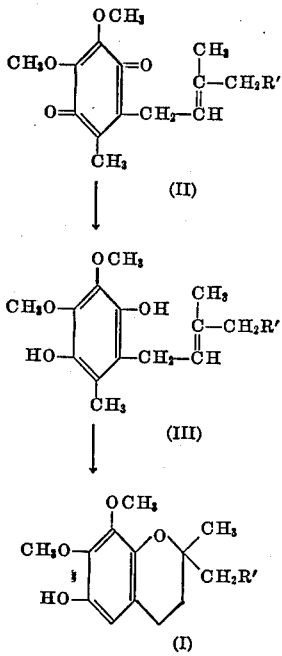

wherein R' is as defined above.

In accordance with one embodiment of the present invention, the chroman, Compound I is prepared by first reducing the quinone compound to the corresponding hydroquinone and then heating the hydroquinones in the presence of a suitable acid catalyst in excess of about 50° C. The first step of this process comprising the reduction of the quinone compound can be carried out by a number of different procedures. Thus, the reduction can be effected by treatment with reducing agents such as sodium borohydride, metal and acid combinations of sodium hydrosulfite. The second step of the reaction is carried out by heating the hydroquinone in the presence of a suitable acid catalyst such as p-toluene sulfonic acid, sulfuric acid, formic acid and the like. Alternatively the conversion of the hydroquinone to the chroman compound can be effected by heating the hydroquinone compound in the presence of a catalyzing agent such as zinc chloride, stannous chloride, and the like. Generally in carrying out this step of the process, it is desirably effected in the presence of a suitable solvent for the hydroquinone such as glacial acetic acid, dioxane and the like at a temperature of about 100° C.

In accordance with a further embodiment of our invention the new chroman compounds may be formed directly from the alkylated benzoquinone, e.g., 2,3-dimethoxy-5-methyl-6-phytyl benzoquinone by heating with a reducing agent, e.g., stannous chloride under acidic conditions thereby effecting reduction to the intermediate hydroquinone and direct cyclization to the desired chroman compound, e.g., 2,5-dimethyl-2-(4',8',12'-trimethyl-tridecyl)-6-hydroxy-7,8-dimethoxy chroman.

In another specific embodiment of our invention the new chroman, 2,2,5-trimethyl-6-hydroxy-7,8-dimethoxy chroman is directly formed from the known 2,3-dimethoxy-5-methyl hydroquinone by heating in the presence of a suitable alkylating agent such as 3-methyl-2-butenyl bromide and an acidic catalyst such as zinc chloride or the like.

The new chromans of the present invention, namely, Compounds I and IV, can be readily converted to the corresponding acyl derivatives by reaction with suitable acylating agents. The acylated derivatives thus obtained are useful products which are valuable means of identifying and further purifying the chroman compounds. In addition, the acylated derivatives are useful since they are less sensitive to oxygen and peroxide and hence can be stored for longer periods of time without deterioration. Although any of the various acyl derivatives can be used, we have found that the acyl derivatives of carboxylic acids having from one to nine carbon atoms are especially useful, and these acyl compounds represent preferred embodiments of the present invention. These acylated compounds are readily prepared by reacting the chromans with the appropriate carboxylic acid chlorides or anhydrides, preferably in the presence of a suitable base such as pyridine or a complex-forming agent. The acylated chromans are readily reconverted to the corresponding chomans by mild acid hydrolysis or by reaction with lithium aluminum hydride or Grignard reagent.

The new chromans of the present invention are useful antioxidants which can be used to inhibit the oxidation of various animal and vegetable fats and oils. These chromans can be used either by themselves or in combination with other antioxidant materials which are known in the art as antioxidants.

The following examples are given to illustrate the procedures for the preparation of the new compounds of the present invention:

EXAMPLE I

*Preparation of 2,2,5'-Trimethyl-6-Hydroxy-7,8-Dimethoxy Chroman*

A solution of 0.5 g. of 5-methyl-2,3-dimethoxy-1,4-hydroquinone is made in 10 ml. of dry dioxane and 1 g. of anhydrous zinc chloride is added. This mixture is stirred at room temperature under an atmosphere of nitrogen for two hours, while a solution of 1.24 g. of 3 methyl-2-butenyl bromide in 5 ml. of dry dioxane is added dropwise; the mixture is then stirred for an additional hour. The mixture is filtered and the filtrate concentrated under reduced pressure to a residual light brown oil which is evaporatively distilled at 130° under reduced pressure (2 mm. of mercury). The distillate weighs 0.37 g., M.P. 62–82°

$\lambda_{max.}^{chl.}$ at 292 m$\mu$, 296 m$\mu$, 299 m$\mu$ (shoulder at 300–302 m$\mu$)

The starting material, 5-methyl-2,3-dimethoxy-1,4-hydroquinone, is prepared from the known 2,3-dimethoxy-5-methyl-benzoquinone [W. K. Anslow, I. N. Ashley and H. Raistrick J. Chem. Soc., 439 (1938)], by reduction according to the detailed description included in Example 1 of the copending U.S. application Ser. No. 758,648, filed August 25, 1958, of Karl Folkers and Clifford Shunk.

EXAMPLE II

*2,2,5-Trimethyl-6-Acetoxy-7,8-Dimethoxy Chroman*

A solution of 0.10 g. of 2,2,5-trimethyl-6-hydroxy-7,8-dimethoxy chroman in 5 ml. of anhydrous pyridine is treated with 1 ml. of reagent acetic anhydride and warmed in the steam bath for one hour under protection from moisture. The mixture is then concentrated under vacuum to a residual oil, stirred for approximately one-quarter hour with 10 ml. of water and extracted three times with 20 ml. of ether. The ether extracts are combined, washed with saturated sodium chloride solution, dried over anhydrous sodium sulfate, filtered and concentrated free of solvent. The light yellow-brown residue obtained is the acetyl derivative, 2,2,5-trimethyl-6-acetoxy-7,8-dimethoxy chroman.

EXAMPLE III

*2,2,5-Trimethyl-6-Butyryloxy-7,8-Dimethoxy Chroman*

Treatment of 0.10 g. of 2,2,5-trimethyl-6-hydroxy-7,8-dimethoxy chroman in 5 ml. of dry pyridine with 0.3 g. of N-butyryl chloride by dropwise addition during one-quarter hour at room temperature, followed by warming the reaction mixture in the steam bath for one-quarter hour, and isolation of the product by pouring the reaction mixture on to 5 volumes of ice and water, extraction with ether and washing, drying, filtering and evaporating the ether extract obtained after the manner of Example II, yields a residual light yellow-brown oil, comprising 2,2,5-trimethyl-6-butyryloxy-7,8-dimethoxy chroman.

EXAMPLE IV

*6-Hydroxy-7,8-Dimethoxy-2,5-Dimethyl-2-(4',8',12'-Trimethyl-tridecyl)-Chroman*

A solution of 0.755 g. (0.99165 mole) of 2,3-dimethoxy-5-methyl-6-phytylbenzoquinone in 50 ml. of glacial acetic acid is heated to reflux temperature. Solid stannous chloride is added slowly in portions until a total of 0.86 g. have been added. The mixture is then heated at reflux for 30 minutes. The reaction mixture is concentrated under reduced pressure to a residue which is dissolved in petroleum ether and washed several times with water. The petroleum ether solution is dried over anhydrous magnesium sulfate and concentrated under reduced pressure to leave a brownish-yellow oil; weight 0.685 g.

$\lambda_{max.}^{isooctane}$ 293 m$\mu$, $E_{1\,cm.}^{1\%} = 64.4$

This product is then dissolved in isooctane and chromatographed on a column of 50 g. of Florisil (a commercially available activated magnesium silicate, 60–100 mesh) packed in isooctane. Fractions are eluted with a mixture of isooctane and 2% diethyl ether. Those fractions (2 through 7 inclusive) having substantial absorption in the ultraviolet (with $\lambda_{max}=293$ m$\mu$) are collected; the weight of these total 0.49 g. Each fraction is distilled in a short-path evaporative apparatus under reduced pressure. Proton magnetic resonance spectra for the fractions are consistent with the proposed structure.

Ultraviolet absorption of fraction 3 in isooctane; $\lambda_{max}—293$ m$\mu$, $$E_{1\,cm.}^{1\%} = 81$$

The infrared spectrum (liquid phase) shows principal bands at 2.8$\mu$ (shoulder 2.85$\mu$), 3.35$\mu$, 6.8$\mu$, 7.0$\mu$, 7.2$\mu$, 8.85$\mu$, 9.0$\mu$, and 9.4$\mu$.

The starting material, 2,3-dimethoxy-5-methyl-6-phytyl-benzoquinone is prepared by the reaction of 2,3-dimethoxy-5-methyl-hydroquinone in the presence of potassium acid sulfate at 70–76° C. for about 1.5 hours. This preparation is described in greater detail in Example II of copending U.S. application Ser. No. 757,464, filed August 27, 1958, of Karl Folkers and Clifford Shunk.

EXAMPLE V

*2,5-Dimethyl-2(4',8',12'-Trimethyl-Tridecyl)-6-Acetoxy-7,8-Dimethoxy Chroman*

A solution of 0.10 g. of 2,5-dimethyl-2-[4,8,12-trimethyl-(tridecyl)]-6-hydroxy - 7,8 - dimethoxy chroman, prepared as exemplified in Example IV, in 5 ml. of anhydrous pyridine is treated with 1.0 ml. of acetic anhydride and the mixture is warmed in the steam bath for one hour, under protection from moisture. The mixture is cooled, concentrated under vacuum until approximately all of the pyridine is removed, treated with about 20 ml. of water, and extracted three times with equal volumes of ether. The ether extracts are combined, washed with water twice, dried over anhydrous sodium sulfate, filtered and concentrated to an oily, slightly colored residue, weighing approximately 0.09 g. after residual solvent is removed under vacuum, the residue comprises the acetate of the chroman, i.e.: 2,5-dimethyl-2[4,8,12-trimethyl-tridecyl]-6-acetoxy-7,8-dimethoxy chroman.

EXAMPLE VI

*2,5-Dimethyl-2(4'-Methyl-3'-Pentenyl)-6 Hydroxy-7,8-Dimethoxy Chroman*

A solution of 50 mg. of 2,3-dimethoxy-5-methyl-6- geranyl benzoquinone in 8 ml. of glacial acetic acid is heated to reflux temperature and 7.0 mg. of stannous chloride (1 equivalent) is added. Heating at reflux temperature is continued for eight minutes, after which the solvent is removed under reduced pressure at approximately 40–45° C. The residue is dissolved in petroleum ether (B.P. 40–60° C.) and washed with water several times. The petroleum ether extracts are dried, filtered and concentrated to an oily residue, weighing 35 mg. of crude 2,5-dimethyl - 2 - (4' - methyl - 3' - pentenyl) - 6 - hydroxy-7,8-dimethoxy-chroman.

The isolation of the purified chroman is accomplished by dissolving the crude material in isooctane and chromatographing the material on a column of approximately 15 g. of Florosil (a commercially available activated magnesium silicate), using a mixture of 2% diethyl ether (v./v.) in isooctane for preliminary development and 5% diethyl ether (v./v.) in isooctane for elution of the purified chroman. A slightly yellow oil comprising 2,5-dimethyl - 2 - (4' - methyl - 3' - pentenyl) - 6 - hydroxy-7,8-dimethoxy chroman having an ultraviolet absorption maximum in isooctane at 293 mμ, and which gives a positive test in the ferric chloride-bipyridyl reaction for assay of 6-chromanols.

The starting material of this example, 2,3-dimethoxy-5-methyl-6-geranyl benzoquinone, is conveniently prepared by reaction of 2,3-dimethoxy-5-methyl-hydroquinone in the presence of potassium acid sulfate at 74° C. for about six hours to form 2,3-dimethoxy-5-methyl-6-geranyl-hydroquinone followed by oxidation with silver oxide to form the corresponding 2,3-dimethoxy-5-methyl-6-geranyl-benzoquinone. This reaction is described in greater detail in the copending U.S. application Ser. No. 758,648, filed August 25, 1958, of Karl Folkers and Clifford Shunk.

EXAMPLE VII 2,5-Dimethyl-2-(4'-Methyl-3'-Pentenyl)-6-Propionyloxy-7,8-Dimethoxy-Chroman Approximately 10 mg. of 2,5-dimethyl-2-(4'-methyl-3'-pentenyl)-6-hydroxy-7,8-dimethoxy chroman is dissolved in 5 ml. of dry pyridine and 0.3 g. of propionyl chloride is added to the solution dropwise over a period of approximately 15 minutes maintaining the reaction solution at 25° C. The entire reaction mixture is then heated for an additional 15 minutes at steam bath temperature and poured into approximately 25 ml. of an ice and water mixture. The product is then isolated by extraction with ether; the ether extract of product is washed with water, dried and filtered. The solvents are removed from the dried extract by evaporation under reduced pressure leaving a residual oil comprising 2,5-dimethyl-2-(4-methyl-3-pentenyl)-6-propionyloxy-7,8-dimethoxy-chroman.

What is claimed is:

1. A chroman compound of the formula

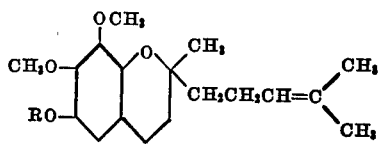

wherein R is a member selected from the group consisting of hydrogen and an acyl radical of an unsubstituted lower alkanoic acid.

2. 2,5 - dimethyl - 2 - (4' - methyl - 5' - pentenyl) - 6 - hydroxy-7,8-dimethoxy chroman of the formula

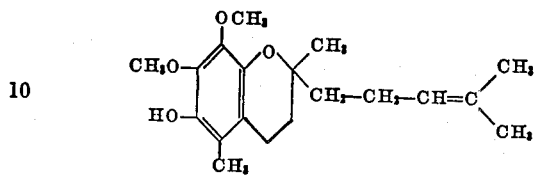

3. 2,5 - dimethyl - 2 - (4' - methyl - 5' - pentenyl) - 6 - propionyloxy-7,8-dimethoxy chroman of the formula

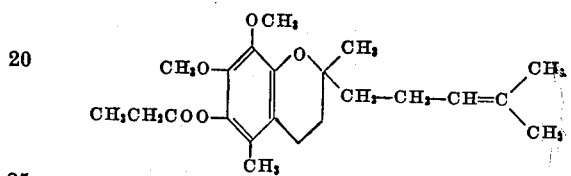

4. The process for producing a chroman compound of the formula

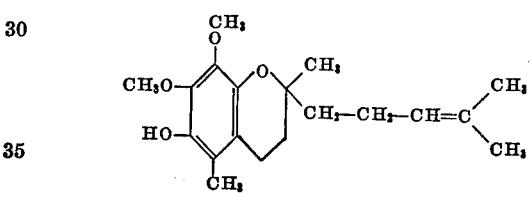

which comprises heating a compound of the formula

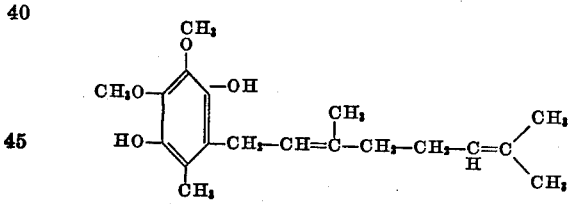

in the presence of stannous chloride.

References Cited in the file of this patent

FOREIGN PATENTS 529,081   Great Britain _____ Nov. 13, 1940

OTHER REFERENCES

Karrer et al.: Helvetica Chimica Acta, vol. 32, pages 1361–7 (1949).

Noller: Chemistry of Organic Compounds, 2nd ed., page 504 (1957).

UNITED STATES PATENT OFFICE
CERTIFICATE OF CORRECTION

Patent No. 3,026,330                  March 20, 1962

Karl Folkers et al.

It is hereby certified that error appears in the above numbered patent requiring correction and that the said Letters Patent should read as corrected below.

Column 2, lines 23 to 29, formula (I) should appear as shown below instead of as in the patent:

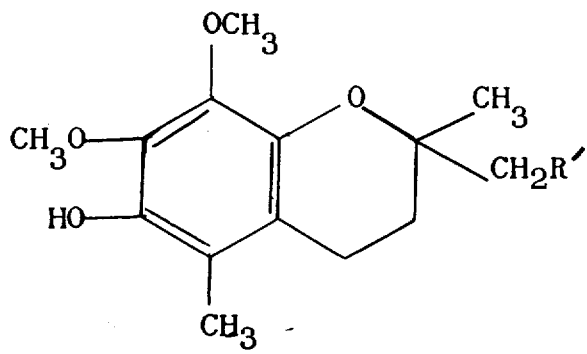

column 5, lines 55 to 60, the formula should appear as shown below instead of as in the patent:

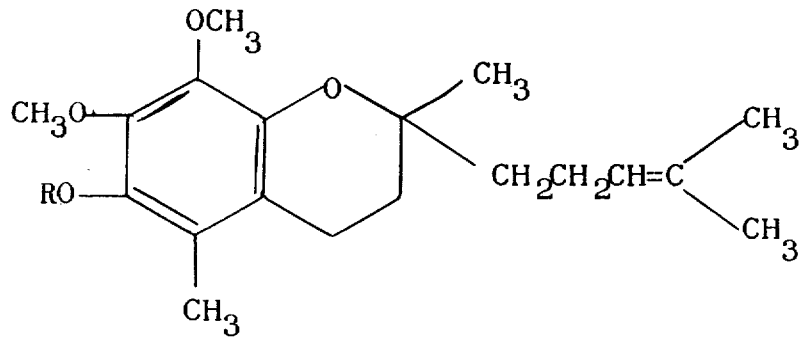

Singed and sealed this 27th day of November 1962.

(SEAL)
Attest: ESTON G. JOHNSON

Attesting Officer

DAVID L. LADD
Commissioner of Patents

Notice of Adverse Decision in Interference

In Interference No. 94,714 involving Patent No. 3,026,330, K. Folkers and D. E. Wolf, CHROMAN COMPOUNDS HAVING ANTIOXIDANT ACTIVITY, final judgment adverse to the patentees was rendered Dec. 23, 1966, as to claims 1, 2 and 3.

[*Official Gazette March 7, 1967.*]